US010333930B2

(12) United States Patent
Devaney et al.

(10) Patent No.: US 10,333,930 B2
(45) Date of Patent: Jun. 25, 2019

(54) SYSTEM AND METHOD FOR TRANSPARENT MULTI-FACTOR AUTHENTICATION AND SECURITY POSTURE CHECKING

(71) Applicant: General Electric Company, Schenectady, NY (US)

(72) Inventors: Louis Francis Devaney, Van Buren Township, MI (US); Stephen Anthony Salerno, Van Buren Tounship, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 165 days.

(21) Appl. No.: 15/350,912

(22) Filed: Nov. 14, 2016

(65) Prior Publication Data

US 2018/0139205 A1 May 17, 2018

(51) Int. Cl.
*H04L 29/06* (2006.01)

(52) U.S. Cl.
CPC ........ *H04L 63/0876* (2013.01); *H04L 63/062* (2013.01); *H04L 63/0823* (2013.01); *H04L 63/101* (2013.01); *H04L 63/108* (2013.01); *G06F 2221/2151* (2013.01); *H04L 63/068* (2013.01); *H04L 2463/082* (2013.01)

(58) Field of Classification Search
CPC ............... H04L 63/0876; H04L 63/062; H04L 63/0823; H04L 63/101; H04L 63/108
See application file for complete search history.

(56) References Cited

U.S. PATENT DOCUMENTS 8,607,306 B1 * 12/2013 Bridge .................. H04L 63/068 726/1
9,537,865 B1 * 1/2017 Borovoy ................. H04L 63/10
2011/0093938 A1 * 4/2011 Asokan .................. G06F 21/31 726/7

(Continued)

OTHER PUBLICATIONS

Gunnar Peterson, "Security Architecture Blueprint," Arctec Group, LLC, pp. 1-12, 2006 (Year: 2006).*

(Continued)

*Primary Examiner* — Luu T Pham
*Assistant Examiner* — Canh Le
(74) *Attorney, Agent, or Firm* — Buckley, Maschoff & Talwalkar LLC

(57) ABSTRACT

A method for creating a secure connection between a remote client computing device and an enterprise asset platform includes a server receiving from a client computing device (CCD) a request being either a registration request or to access the asset platform, including a CCD unique identifier, determining if the CCD is previously blocked from accessing the asset platform, if so then terminating the method. If the request is a registration request, then generating a disambiguation query in accordance with predefined policy, receiving a response to the disambiguation inquiry from the CCD, verifying the contents of the disambiguation query response in relation to a predefined criteria. If the disambiguation query response does meet the predefined policy, associating the CCD to the predefined policy. A system configured to implement the method and a non-transitory computer-readable medium containing instructions for a processor to perform the method are also disclosed.

14 Claims, 5 Drawing Sheets

(56) References Cited

U.S. PATENT DOCUMENTS

2013/0047228 A1* 2/2013 Radhakrishnan ..... H04L 9/3213 726/7
2013/0111541 A1* 5/2013 Yin ...................... G06F 21/577 726/1
2015/0281278 A1* 10/2015 Gooding ................ H04L 63/20 726/1
2016/0050210 A1* 2/2016 Nguyen ............... H04L 63/101 726/4
2016/0094546 A1* 3/2016 Innes ................. H04L 63/0823 713/156
2016/0191567 A1* 6/2016 Chahal ................. H04W 12/00 726/1
2016/0241599 A1 8/2016 Qureshi
2016/0359629 A1* 12/2016 Nadathur ............. H04L 67/141

OTHER PUBLICATIONS

Victor Hazlewood, "Improved Grid Security Posture through Multi-factor Authentication," IEEE/ACM 12 th International Conference on Grid Computing, pp. 106-113, 2011 (Year: 2011).*
International Search Report and Written Opinion issued in connection with corresponding PCT Application No. PCT/US2017/55103 dated Dec. 7, 2017.

* cited by examiner

SYSTEM AND METHOD FOR TRANSPARENT MULTI-FACTOR AUTHENTICATION AND SECURITY POSTURE CHECKING

BACKGROUND

Enterprises invest in remote access services to provide authorized employees, vendors, and other partners with access across a public communication network (e.g., the Internet) into the enterprise's network, data systems, websites, platforms, etc. The remote access should be managed and secure. However, access across shared public networks can be fraught with an array of risks (e.g., unauthorized access, eavesdropping/wire intercept, malware, keylogging & credential misappropriation, data leakage, misplaced/stole device(s), etc.).

Remote access resources can be exploited to breach the network security by hackers. An overwhelming percentage of all hacking breaches originate through hackers accessing the enterprise computing system from remote access service points. These hacking breaches can lead to threats such as worms, viruses, spyware, data theft, application abuse, etc.

Conventional approaches grant remote access by implementing a username/password authentication paradigm. Missing from the art is a solution that provide a user-friendly, cost-effective, transparent enhanced security layer for remote access authentication with repeated security checks.

DETAILED DESCRIPTION

Embodying systems and methods determine whether to grant a request to remote access an enterprise asset. The request evaluation can include a username/password authentication process supplemented with examination of a one or more criteria—for example, an issued cryptographic certificate located on the requesting remote device, the configuration of the requesting remote device itself, the security posture of the device, and other factors. In accordance with embodiments, the examination of the one or more criteria is performed in a manner that is transparent to a user of the remote device.

Embodying systems and methods leverage an encrypted query and response protocol to evaluate the requesting device against policy and device profile information stored in an manner that is inaccessible to the user. Re-evaluation of access decisions can be performed on a repeated basis, and can use rotating questions to evaluate the authentication of a requesting client. The interval between repeated reevaluations can be varied based on a value set in policy. If a policy violation is detected, various actions can be taken—for example, denial and/or revocation of access (temporary, or permanently) as detailed in a predefined policy.

Figure 1:
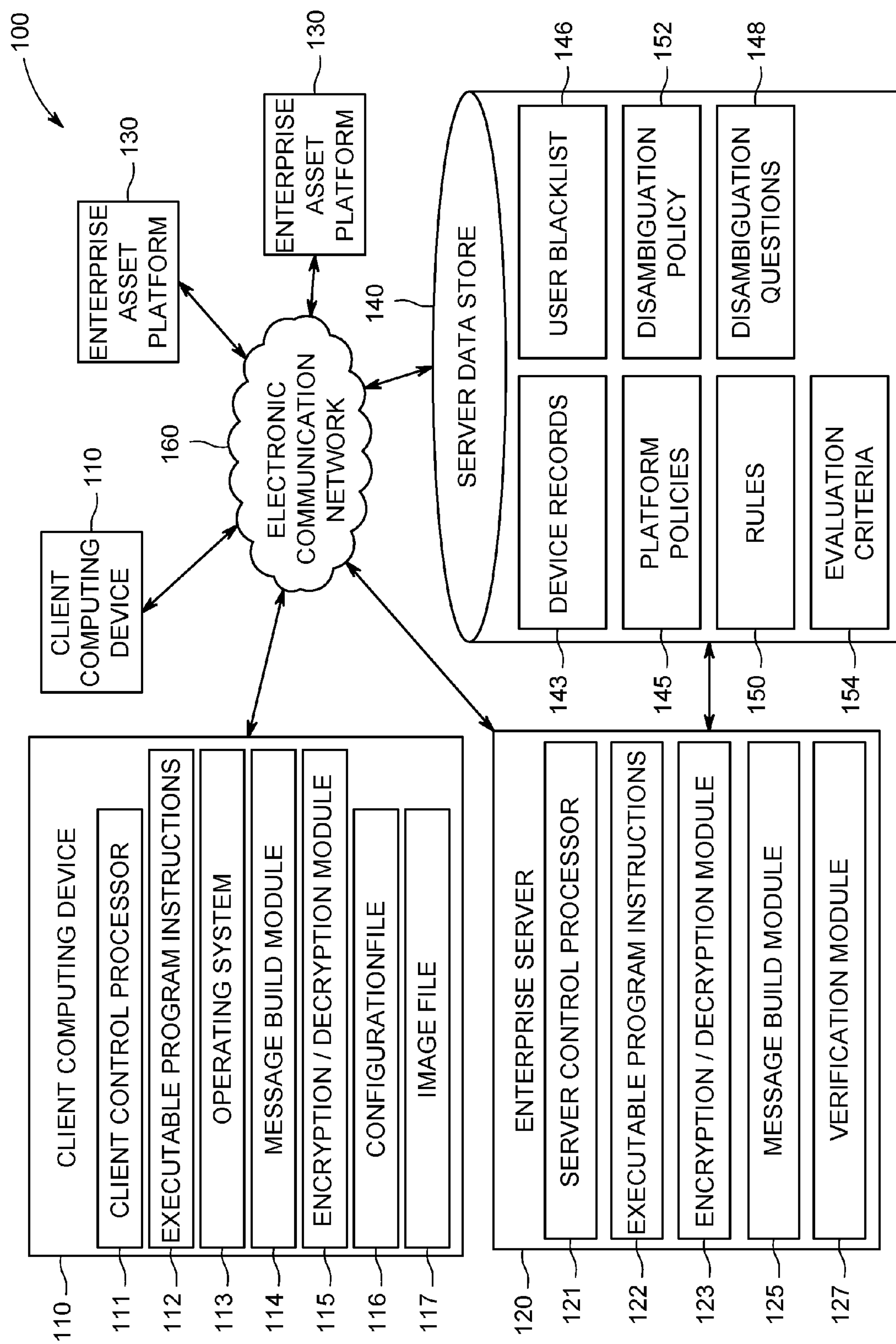
FIG. 1 depicts a remote access security system in accordance with embodiments.

FIG. 1 depicts system 100 for remote access authentication, validation, and security-posture checking in accordance with embodiments. An embodying system can include one or more client computing devices 110. The client computing device can be a computing device suitable for use by an end user in performance of the end user's purpose (e.g., personal computer, workstation, thin client, netbook, notebook, tablet computer, mobile device, etc.).

Client computing device 110 can include client control processor 111 that communicates with other components of the client computing device. Control processor 111 accesses computer executable instructions 113, which can include operating system 113. Message build module 114 can assemble responses to security/authentication queries. Encryption/decryption module 115 can perform encryption/decryption using symmetric and asymmetric algorithms such as, but not limited to, AES and/or RSA and compression/decompression on messages from/to the client computing device. Configuration file 116 can include data regarding hardware and/or software contents of the particular client computing device—for example, installation and/or revision identifiers of antivirus software, word processing software, motherboard serial number, processing unit identifier, etc. Image file 117 can include files accessible during the validation/authentication/security check operations. In accordance with embodiments the configuration data file and image file contents can be checked for compliance with predefined policy to verify the client computing device authenticity.

Enterprise server 120 can include at least one server control processor 121 configured to support embodying verification/authentication/security check operations by executing executable instructions 122 accessible by the control processor. Dedicated hardware, software modules, and/or firmware can implement embodying remote access verification/authentication/security services disclosed herein.

Server message build module 125 can assemble security/authentication queries in accordance with embodying methods. These queries can be sent to a client computing device requesting access to an enterprise asset. Server encryption/decryption module 123 can perform symmetric and asymmetric encryption/decryption and compression/decompression on messages from/to the client computing device. Verification module 127 can apply rules and/or one or more policies in accordance with embodying operations to determine compliance of a requesting client computing device response to queries sent to server 120.

Server 120 is in communication with data store 140. Server side message build module 125 can assemble queries for the security/authentication operations. These queries are based on predefined conditions that are expected from a requesting client computing device. The queries can include references to unique configuration data stored in device records 143 previously collected from the client computing device. Server side encryption/decryption module 123 can perform symmetric and asymmetric encryption/decryption and compression/decompression on messages from/to the requesting client computing device.

Elements within the data store can be used in developing the queries sent to a client computing device requesting access to enterprise asset platform 130. These elements can include user blacklist 146 (e.g., a listing of unauthorized client computing device identifiers, and user ids), device records 143 (e.g., unique configuration data previously collected from the client computing device, including policy association), platform policies 145 (e.g., policies aggregating rules associated with a given client device standard software load), disambiguation policy 152 (e.g., mapping data associating disambiguation questions to associated policy with weighted point values), disambiguation questions 148 (e.g., predefined interrogatories), rules 150 (e.g., one or more set of predefined interrogatories used to create queries), and evaluation criteria 154 (information used to determine passing responses, and the actions to take for failing responses).

System 100 includes one or more enterprise asset platform(s) 130. Each enterprise asset platform is remotely accessible across electronic communication network 160. An enterprise asset platform can be, for example, one of a node on an enterprise's network, a data system, a website, and/or other platform that can be remotely accessed. In some implementations the asset platform can also act as a gateway providing access to a network of protected enterprise resources. In accordance with embodiments, an enterprise asset platform can be included within enterprise server 120.

Each of the components of system 100 can be in communication across electronic communication network 160. The electronic communication network can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 160.

Embodying methods apply an encrypted query/response protocol to verify credentials and evaluate endpoint security at a client computing device requesting access to one of the enterprise remote assets. Data store 140 includes a policy store with endpoint questions and criteria describing how the questions could be evaluated. These questions and criteria are based on predefined paradigms provided by the enterprise personnel—e.g., IT professionals, network security experts, etc.

In accordance with an implementation, a query can be sent to the client computing device asking for a list of some, or all, programs/applications (and also in some instances version identifiers) that the client computing device is running. The client computing device can assemble a response by examining configuration file 116 for responsive details. Rules 150 specific to a particular policy can evaluate a response in a variety of ways by checking. As a non-limiting example, the rules could check to make sure that approved antivirus software is running, or check to make sure that prohibited software is not installed on the client computing device. Because the evaluation occurs at enterprise server 120, which is remote from the client computing device, the client has no visibility into the evaluation criteria, the policy, or the rules being used.

Conventional approaches to approving remote access to asset platforms face a significant drawback in that cryptographic certificates can be copied. Thus, enabling for computing device and/or local user impersonation. Embodying systems and methods perform the security verification in a manner transparent to the client computing device and its local user. Accordingly, embodiments solve this problem by ensuring that the cryptographic certificate can only be used on the client computing device to which it was issued, and by testing the security posture of the client computing device when authentication occurs. Thus, embodiments minimize the risk from certificate theft, while ensuring that the client computing device is policy compliant.

In accordance with embodiments, the association between User Identity/Certificate/Device Identifiers is maintained within elements of data store elements 140. Query response(s) received from a client computing device requesting access to an asset platform is checked on the server side against the information stored in the data store. In some implementations, device identifiers can be "learned" from individual client computing devices, stored in the data store, and then used later during the verification/check comparison.

In accordance with embodiments, the predefined policy and/or paradigms can be updated or modified periodically, or non-periodically. The policy and paradigm can be configured to prevent tampering attempts, identify active session attacks-in-progress, and to enact countermeasures against a detected attacker. By implementing the predefined policy and rules, embodying systems and methods ensure that authentication is happening in a trustworthy context—for example, is the required software running? Is device tampering detected?)

Embodying systems and methods perform a security analysis of client computing device(s) by querying the client computing device for architectural details, and then analyzing the query responses remote from the client computing device. in accordance with embodiments, different levels of access can be granted providing access to different enterprise asset platforms. The queries sent to the client computing device can transparently request multiple factors to be used in the device authentication—for example, user SSO/Password; enterprise-issued User/Device Certificate; Unique Device Attributes (configuration data, image file content, etc.).

In accordance with embodiments methods can include repeated endpoint validation techniques. These techniques can implement a policy-based approach to require that a client computing device is in compliance with predefined policy and/or criteria. Failure to be in compliance results in access to enterprise asset platforms being denied, or the termination of in-progress access. In some implementations, individual device fingerprinting can be used to fully or partially identify devices.

In accordance with embodiments, systems and methods can perform a three stage approach to disambiguate, validate, and register a remote client computing device that is requesting access to an enterprise asset platform. Once a client computing device has registered, the system can transparently validate the user and client computing device to provide secured access. This transparent validation can use repeated security checks during the user session. The operations can be performed transparent to the local user of the client computing device.

Figure 2:
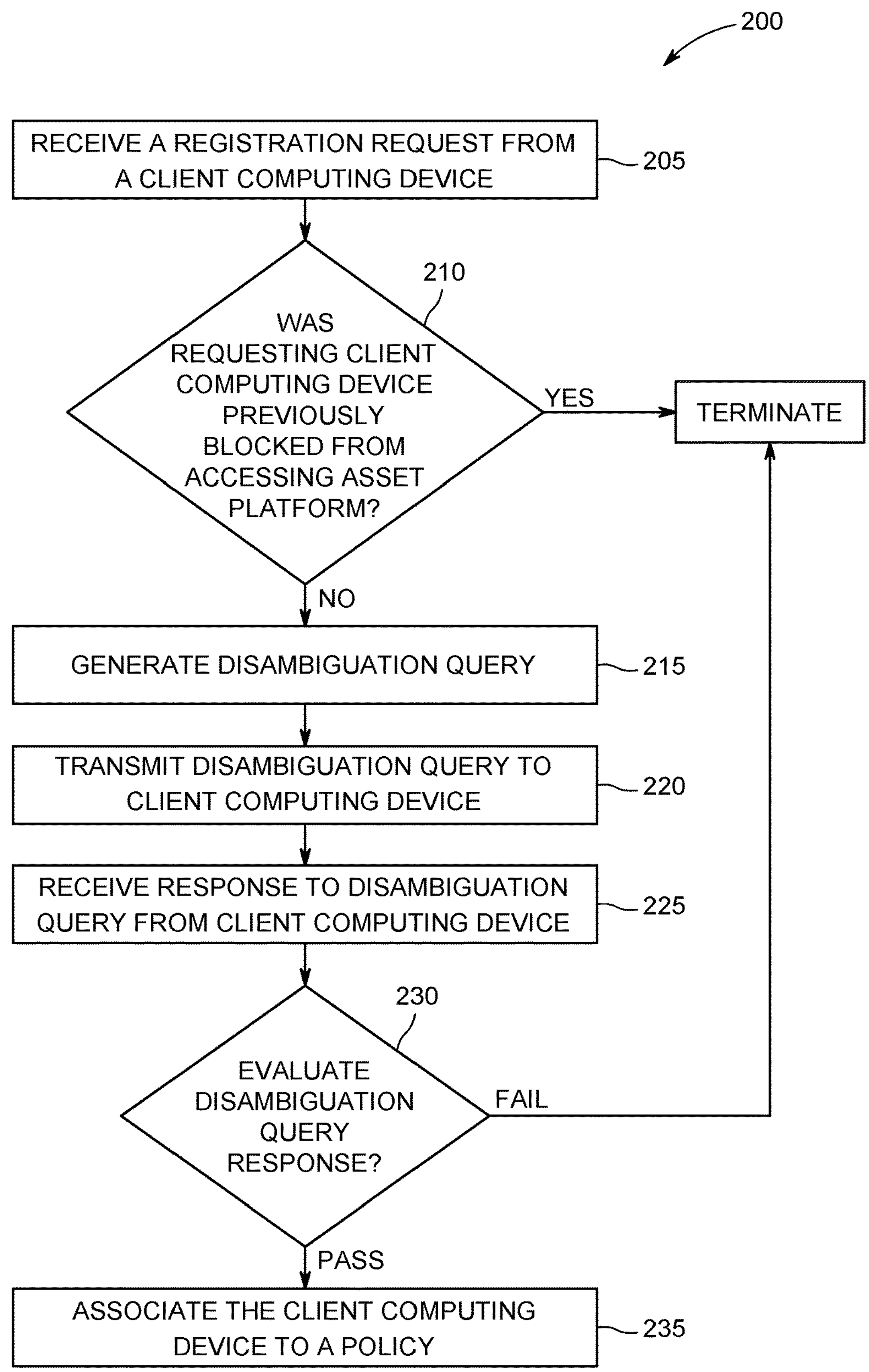
FIG. 2 depicts a flowchart of a process for device disambiguation in accordance with embodiments.

FIG. 2 depicts a flowchart of device disambiguation process 200 in accordance with embodiments. Disambiguation process 200 queries a client computing device to associate it with platform policy 145 appropriate for client computing device's configuration using predefined, predetermined disambiguation questions resident in data store 140. By employing embodying systems and methods an enterprise can test different client device software configurations against policies suited for those configurations (for instance, an enterprise could maintain two client device platforms with different but acceptable antivirus software). A registration request for clearance to access the registration server enterprise asset platform resource 130 can be received at server 120 from client computing device 110, step 205. The registration request can be asymmetrically encrypted with the server's public key.

The server decrypts the registration request. The server compares the identity of the client computing device and/or the local user identity to a listing of blocked identities maintained in user blacklist 146, step 210. If the user or the device is blocked from accessing remote assets, the process terminates.

If the user or the device identity does not appear on the blocked list, a disambiguation query is generated, step 215. The disambiguation query queries the client computing device for specific configuration information based on predefined policy, rules assigned to the type of request. The disambiguation query can include a timestamp.

The server transmits, step 220, the disambiguation query to the requesting client computing device. The disambiguation query can be encrypted and/or compressed on the server side. Client message build module 114 can assemble responses to the disambiguation query. Based on the nature of the query, the response can include details on software configuration installation revision identifiers of antivirus software, word processing software, motherboard serial number, processing unit identifier, data regarding hardware of the client computing device, image file content, and other details in accordance with predefined disambiguation policies.

The server receives, step 225, from the client computing device a response to the disambiguation query. The response itself can be encrypted and/or compressed. Based on the contents of the response, the client computing device can be assigned to platform policy 145. The response is evaluated, step 230, by assigning points to each portion of the query response. If the assigned points are greater for a particular policy, the client computing device is associated with that policy, step 235. If the response fails the evaluation, the process terminates. In some implementations, for example, a tie between policies, the client computing device can be evaluated based on a configured system default policy. During initial registration, once the client computing device has been associated with a policy, it will be validated using process 300 (FIG. 3).

Figure 3:
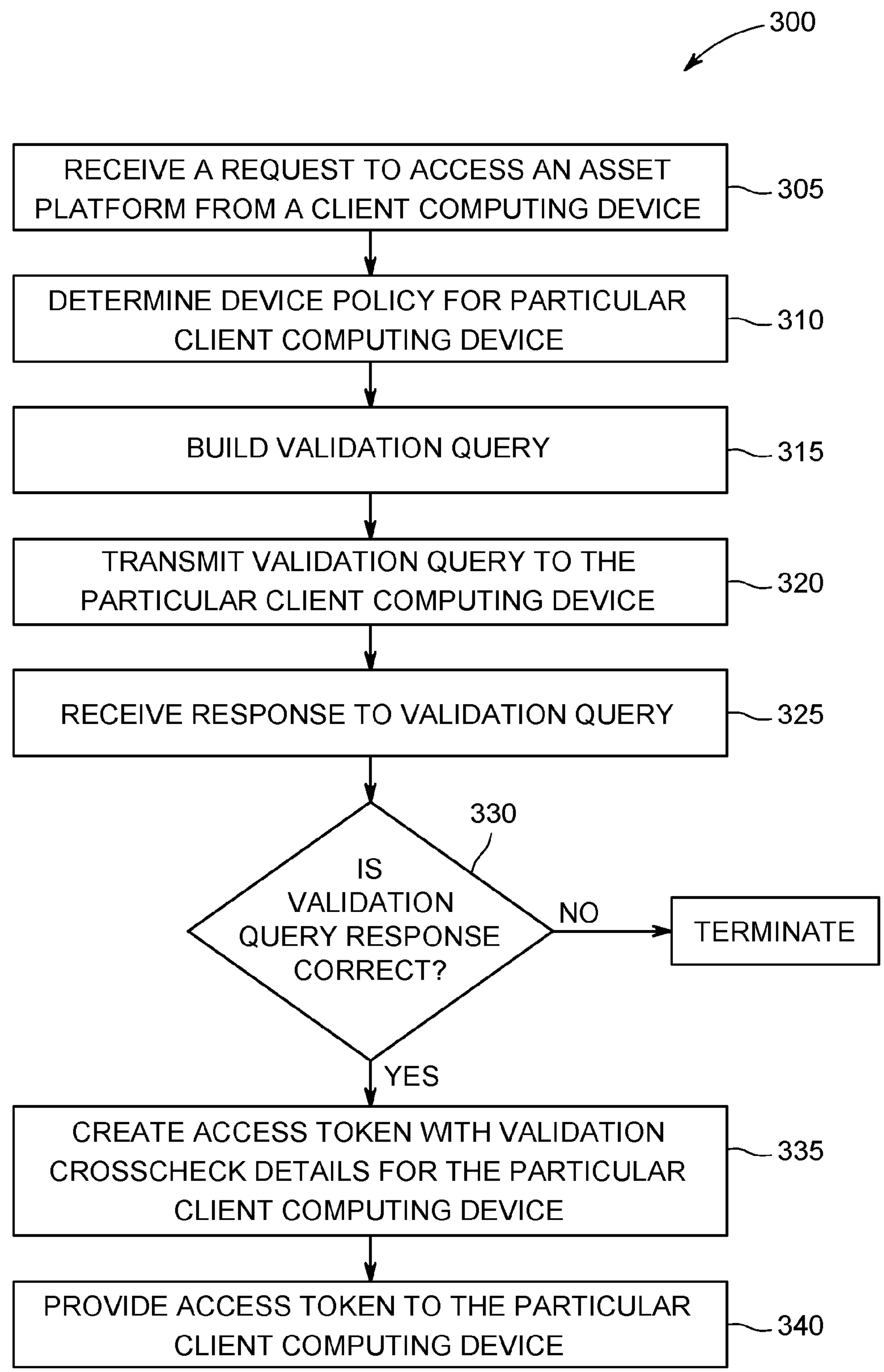
FIG. 3 depicts a flowchart of a process for device validation in accordance with embodiments.

FIG. 3 depicts a flowchart of device validation process 300 in accordance with embodiments. Validation process 300 queries a client computing device requesting access to an enterprise asset platform to determine its authenticity based on a policy assigned during disambiguation process 200 in combination with predefined, predetermined questions resident in data store 140. A request to access enterprise asset platform resource 130 can be received at server 120 from client computing device 110, step 305.

The server determines, step 310, the policy assigned to the particular client computing device requesting the access. The determination is based on a policy stored in device records 142 as a result of disambiguation process 200. If the particular client computing device has not yet been assigned a policy, process 300 is terminated, and server 120 executes disambiguation process 200 described above.

A validation query is built, step 315, using questions from the assigned policy and rules 150. The purpose of the validation query is to evaluate whether the actual requesting client computing device is policy complaint and can be trusted with remote access to the asset platform. Based on defined rules 150, the query can contain rotating questions that vary with each query instance. The query can contain questions associated with the requested enterprise asset platform (e.g., questions asked for a device requesting registration access may vary from questions asked for a device requesting network access). The server transmits, step 320, the validation query to the requesting client computing device. In some implementations the query can be timestamped. The validation query can be encrypted and/or compressed on the server side. Client message build module 114 can assemble responses to the validation query. Based on the nature of the query, the response can include details on software configuration installation revision identifiers of antivirus software, word processing software, motherboard serial number, processing unit identifier, data regarding hardware of the client computing device, image file content, and other details in accordance with predefined policies.

The server receives, step 325, from the client computing device a response to the validation query. The response itself can be encrypted and/or compressed. The response is evaluated by checking query answers against evaluation criteria 154 residing in data store 140. The evaluation criteria is resident on the server side of system 100, and the evaluation of the query response is performed on the system's server side. The client computing device is not exposed to the criteria, nor the response evaluation, making the process transparent to the client computing device and its local user.

Figure 4:
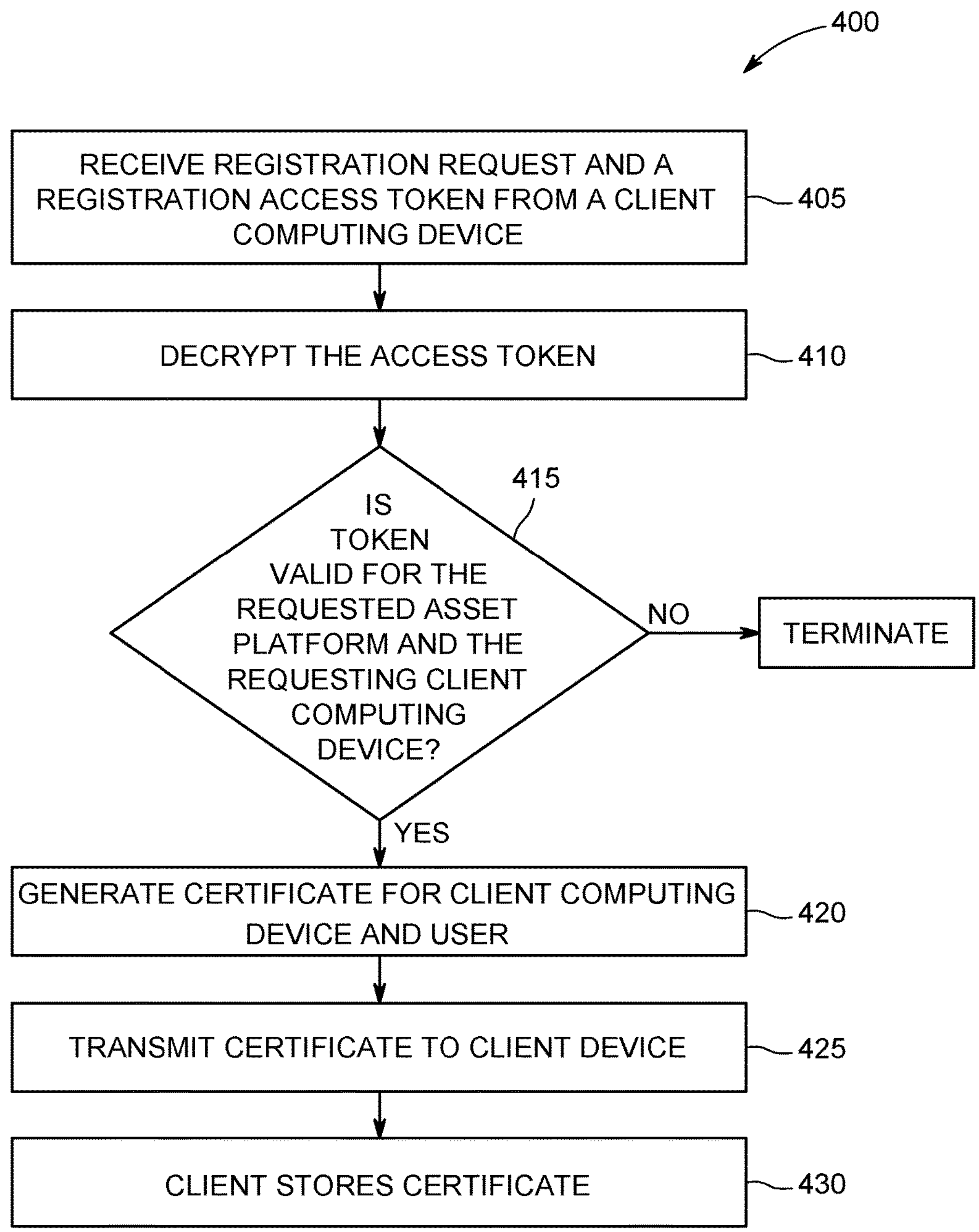
FIG. 4 depicts a flowchart of a process for device registration in accordance with embodiments.
Figure 5:
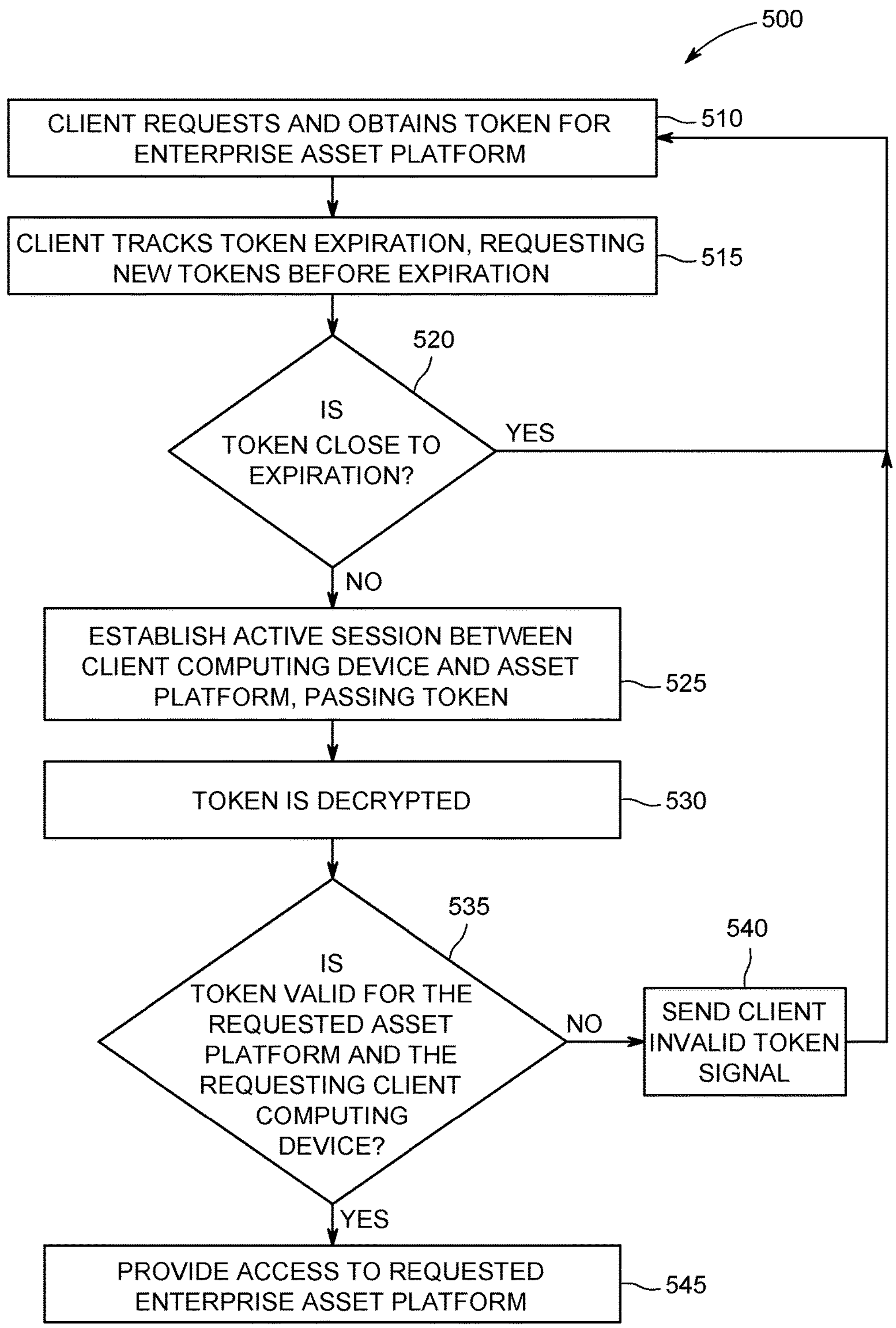
FIG. 5 depicts a flowchart of a process for security posture recheck/authentication in accordance with embodiments.

If the evaluation of the validation query response determines, step 330, that the response is not correct, validation process 300 terminates. With successful validation, process 300 creates an access token, step 335 for the particular client computing device requesting access to the asset platform. The access token can be an asymmetrically signed using an algorithm such as RSA so that it can only be read by the particular asset platform requested by the client computing device. This access token can include details for validation crosscheck. In addition, the access token can be time stamped and associated with a predetermined expiration deadline for added security. The access token is provided, step 340, to the client computing device. With this token, the client computing device can be verified when connection is made with the enterprise asset platform identified in the received request (step 305). If the token is to be used in an initial registration, it can be passed to a registration enterprise resource platform as described below in registration process 400 (FIG. 4). If the token is to be used for post-registration access to a protected enterprise resource platform, it can be used as described in security posture recheck/authentication process 500 (FIG. 5).

FIG. 4 depicts a flowchart of device registration process 400 in accordance with embodiments. Registration process 400 performs the tasks of verifying a registration access token, and generating a user/device certificate that can be used in validation after registration. A registration request (including a client certificate signing request) with an access token is received, step 405, from the client computing device. This request can be received at the registration asset platform, or server.

In accordance with implementations, registration process 400 can be performed at the server, at the asset platform, and/or the server and asset platform acting in combination. The asset platform can include a Certificate Authority functionality for generating client user/device certificates. The asset platform can also include an application that performs additional security checking needed for registration, such as user password checking or one-time password checking.

The token is decrypted, step 410. The decrypted access token is verified, step 415. Verification can include signature checking the token; checking client computing device details resident in data store 140 obtained during device disambiguation process 200 and/or device validation process 300; checking whether the token user matches user authentication and authorization information; and that the token has not yet expired.

If the token is not verified, access to the asset platform is denied and the process is terminated. If the token is verified, a certificate is generated, step 420, for the client computing device and user. The access certificate is then transmitted to the client computing device, step 425. Once received, the certificate is securely stored, step 425, on the client computing device. In some implementations the certificate can be placed in a client Crypto API (CAPI) certificate store.

FIG. 5 depicts a flowchart of security posture recheck/authentication process 500 for client enterprise asset access in accordance with embodiments. Access to the enterprise asset platform can be accomplished using a web browser or through methods including resource proxying or network tunneling over a Transport Layer Security (TLS) layer for enterprise access platforms allowing access to a protected network segment. When TLS tunneling is used, the client certificate obtained during registration process 400 can be transparently presented for authentication purposes and the connection can be pinned (by having the client check static details about the enterprise asset TLS connection) to prevent interception.

Client computing device 110 can establish session cross-check information to be used with the enterprise asset platform. In accordance with implementations, the cross-check information can be derived locally or provided by the asset platform before access. This crosscheck information is used to request validation, step 505, using device validation process 300. If validated, an access token is provided along with expiration time information. The expiration time can be encrypted.

The client computing device can track the expiration time of the provided token, step 510. A renewal request can be made utilizing process 300 prior to expiration, step 515. The token is presented to the enterprise asset platform for use in authenticating access. An active session is established, step 520, between the client computing device and the asset platform by passing the token.

The token is decrypted, step 525. The decrypted access token is verified, step 530, for its being valid for the requested asset platform and valid for the requesting client computing device. Verification can include signature checking the token; checking crosscheck details contained within the token; checking whether the token was issued for the protected resource; checking whether the token user matches the presented client TLS certificate and/or other authentication details; and that the token has not yet expired.

If the token is invalid or expired, a signal will be sent to the client computing device indicating that a valid token is needed, step 535. Process 500 then returns to step 505, where the client computing device requests a new, valid token using process 400. If the presented token is valid, access is granted for the requested enterprise asset platform, step 540. In accordance with embodiments, Process 500 can enter a loop repeating token verification step 530 at intervals set by the associated policy.

Table I provides a matrix detailing an overview of controls implemented by embodying systems and methods to counter specific risks identified in the table. These risks include unauthorized access, eavesdropping and communication intercept, malware, keylogging and credential theft, loss or theft of a client computing device, and data theft/leakage.

TABLE 1

| RISK | EMBODYING CONTROL ACTION |
|---|---|
| Unauthorized Access | Signed access tokens required and continuously re-checked |
| | User must have Password, Certificate obtained in registration, and Device Used to Register |
| Eavesdropping & Wire Intercept | Pinned Transport Layer Security (TLS) Connections |
| | Encrypted proprietary protocol within TLS |
| | Disallowed Process Checks |
| | Anti-Tamper Checks |
| Malware | Access denial if approved anti-virus program not running |
| | Access denial where management software is not running |
| | Disallowed process checks |
| | Anti-tamper checks |
| Keylogging & Credential Theft | Multifactor requires Single sign-on (SSO + Password + Certificate + Device) |
| | Token cross-checks and expiration |
| | Virtual Machine Detection and Blocking |
| Laptop loss or theft | Password required to unlock credential store |
| | System supports lockouts for lost assets |
| | System supports Certificate Revocation |
| Data Leakage | Access denial if approved anti-virus not running |
| | Access denial for unmanaged devices |

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for providing secure, transparent, multi-factor validation, registration, authentication of client computing devices requesting remote access to asset platforms with security posture recheck/authentications, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for creating a secure connection between a remote client computing device and an enterprise asset platform, the method comprising:

receiving at a server a request from a client computing device in communication with the server across an electronic communication network, the request being one of a registration request and a request to access the asset platform, the request including a client computing device unique identifier;

if the request is to access the asset platform, based on a determination that the client computing device is previously blocked from accessing the asset platform, terminating the method;

if the request is to access the asset platform, based on a determination that the client computer device is not previously blocked from accessing the asset platform providing a validation query to the client computing device, the validation query containing questions based on a particular authentication policy previously assigned to the client computing device;

based on a determination that a response to the validation query is correct, providing an access token to the client computing device, the access token verifiable at the asset platform;

receiving at the asset platform the access token from the client computing device with the access request;

decrypting the access token;

verifying the decrypted access token;

if the decrypted access token is not successfully verified, terminating the method;

if the decrypted access token is successfully verified, then:

generating a certificate for the client computing device and an end user of the client computing device;

transmitting the generated certificate to the client computing device;

if the request is a registration request, then:

generating a disambiguation query in accordance with predefined policy at the server;

providing the disambiguation query the client computing device;

receiving a response to the disambiguation inquiry from the client computing device;

verifying the contents of the disambiguation query response in relation to a predefined criteria;

the verifying step being done remote from the client computing device in a manner transparent to a user of the client computing device;

evaluating the disambiguation query response by assigning points to a response for each portion of the disambiguation query;

based on the assigned points, associating the client computing device to the particular authentication policy; and if the disambiguation query response does meet the predefined policy, associating the client computing device to the predefined policy.

2. The method of claim 1, the determining step including comparing the client computing device unique identifier to a listing of blocked client computing devices in a data store that is in communication with the server.

3. The method of claim 1, the disambiguation query including predefined questions resident in a data store in communication with the server.

4. The method of claim 3, the predefined questions based on one or more client computing device configuration details, installed application revision number, listing of installed applications, hardware identifiers, and content from one or more image files.

5. The method of claim 1, including if a cumulative point score is below a predetermined threshold, at least one of terminating the method and assigning a default policy.

6. The method of claim 1, including:

examining at least one of device tables and device records in a data store in communication with server to locate an association between a client computing device identifier and the assigned policy; and if no association is located, terminating the method.

7. The method of claim 6, including:

inserting a timestamp into the access token; and associating the access token with a predetermined expiration deadline.

8. The method of claim 1, including establishing an active session between the client computing device and the asset platform.

9. The method of claim 8, including renewing the token prior to expiration of a time stamp associated with the token.

10. The method of claim 8, including performing security posture rechecks of the client computing device token validity during the session.

11. A non-transitory computer readable medium containing computer-readable instructions stored therein for causing a control processor to perform a method for creating a secure connection between a remote client computing device and an enterprise asset platform, the method comprising:

receiving at a server a request from a client computing device in communication with the server across an electronic communication network, the request being one of a registration request and a request to access the asset platform, the request including a client computing device unique identifier;

if the request is to access the asset platform, based on a determination that the client computing device is previously blocked from accessing the asset platform, terminating the method;

if the request is to access the asset platform, based on a determination that the client computer device is not previously blocked from accessing the asset platform providing a validation query to the client computing device, the validation query containing questions based on a particular authentication policy previously assigned to the client computing device;

based on a determination that a response to the validation query is correct, providing an access token to the client computing device, the access token verifiable at the asset platform;

receiving at the asset platform the access token from the client computing device with the access request;

decrypting the access token;

verifying the decrypted access token;

if the decrypted access token is not successfully verified, terminating the method;

if the decrypted access token is successfully verified, then:

generating a certificate for the client computing device and an end user of the client computing device;

transmitting the generated certificate to the client computing device;

if the request is a registration request, then:

generating a disambiguation query in accordance with predefined policy at the server;

providing the disambiguation query the client computing device;

receiving a response to the disambiguation inquiry from the client computing device;

verifying the contents of the disambiguation query response in relation to a predefined criteria;

the verifying step being done remote from the client computing device in a manner transparent to a user of the client computing device;

evaluating the disambiguation query response by assigning points to a response for each portion of the disambiguation query;

based on the assigned points, associating the client computing device to the particular authentication policy; and if the disambiguation query response does meet the predefined policy, associating the client computing device to the predefined policy.

12. The non-transitory computer readable medium of claim 11 containing computer-readable instructions stored therein to cause the control processor to perform the method including:

establishing an active session between the client computing device and the asset platform;

renewing the token prior to expiration of a time stamp associated with the token; and performing security posture rechecks of the client computing device token validity during the session.

13. A system for creating a secure connection between a remote client computing device and an enterprise asset platform, the system comprising:

a server including a control processor in communication with a client computing device across an electronic communication network, the server in communication with a data store and at least one asset platform across the electronic communication network;

the server including an encryption/decryption module configured to receive from the client computing device a request being one of a registration request and a request to access the asset platform, the request including a client computing device unique identifier;

the server control processor configured to access executable program instructions that cause the server control processor to:

if the request is to access the asset platform, based on a determination that the client computing device is previously blocked from accessing the asset platform by accessing at least one of a device record store and a device table store, terminate creation of the secure connection;

if the request is to access the asset platform, based on a determination that the client computer device is not previously blocked from accessing the asset platform provide a validation query to the client computing device, the validation query containing questions based on a particular authentication policy previously assigned to the client computing device;

based on a determination that a response to the validation query is correct, provide an access token to the client computing device, the access token verifiable at the asset platform;

receive at the asset platform the access token from the client computing device with the access request;

decrypt the access token;

verify the decrypted access token;

if the decrypted access token is not successfully verified, terminate creation of the secure connection;

if the decrypted access token is successfully verified, then:

generate a certificate for the client computing device and an end user of the client computing device; and transmit the generated certificate to the client computing device;

if the request is a registration request, then:

generate at the server a disambiguation query in accordance with a predefined policy;

provide the disambiguation query the client computing device;

receive a response to the disambiguation inquiry from the client computing device;

verify the contents of the disambiguation query response in relation to a predefined criteria;

the verifying step being done remote from the client computing device in a manner transparent to a user of the client computing device;

evaluate the disambiguation query response by assigning points to a response for each portion of the disambiguation query;

based on the assigned points, associate the client computing device to the particular authentication policy; and if the disambiguation query response does meet the predefined policy, associate the client computing device to the predefined policy.

14. The system of claim 13, the server control processor configured to access executable program instructions that cause the server control processor to, if the request is an access request:

establish an active session between the client computing device and the asset platform;

renew the token prior to expiration of the session; and perform security posture rechecks of the client computing device token validity during the session.

* * * * *